(12) United States Patent
Stone

(10) Patent No.: US 6,473,211 B2
(45) Date of Patent: Oct. 29, 2002

(54) OPTICAL CROSSBAR SWITCHING AND/OR ROUTING SYSTEM

(75) Inventor: Thomas W. Stone, Hellertown, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/943,847

(22) Filed: Aug. 31, 2001

(65) Prior Publication Data

US 2002/0005966 A1 Jan. 17, 2002

Related U.S. Application Data

(60) Continuation-in-part of application No. 09/435,708, filed on Nov. 8, 1999, which is a continuation-in-part of application No. 08/926,102, filed on Sep. 9, 1997, now Pat. No. 5,982,515, which is a division of application No. 08/640,187, filed on Apr. 30, 1996, now Pat. No. 5,692,077.

(51) Int. Cl.[7] .............................................. H04B 10/00
(52) U.S. Cl. ....................... 359/117; 359/130; 359/566; 359/573; 385/17
(58) Field of Search .......................... 359/15, 124, 130, 359/117, 566, 567, 568, 569, 570, 571, 572, 573, 574, 575, 576; 385/16, 17

(56) References Cited

U.S. PATENT DOCUMENTS

| | | | |
|---|---|---|---|
| 4,013,000 A | 3/1977 | Kogelnik ..................... 350/96 |
| 4,236,783 A | 12/1980 | Hepner et al. ........... 350/96.13 |
| 5,009,477 A | 4/1991 | Alferness et al. ............. 350/96 |
| 5,133,027 A | 7/1992 | Funazaki et al. ............... 385/5 |
| 5,218,198 A | 6/1993 | Bristow et al. ........ 250/227.24 |
| 5,255,332 A | 10/1993 | Welch et al. .................. 385/17 |
| 5,491,762 A | 2/1996 | Deacon et al. ................ 385/16 |
| 5,581,642 A | 12/1996 | Deacon et al. ................ 385/15 |
| 5,692,077 A | 11/1997 | Stone et al. ................... 385/16 |
| 5,706,383 A | 1/1998 | Malcuit et al. ............. 385/131 |
| 5,771,320 A | 6/1998 | Stone .......................... 385/16 |
| 5,892,864 A | 4/1999 | Stoll et al. .................... 385/14 |
| 5,982,515 A | 11/1999 | Stone et al. ................. 359/111 |
| 6,072,923 A | 6/2000 | Stone .......................... 385/16 |

FOREIGN PATENT DOCUMENTS

WO    WO96/08932    3/1996

OTHER PUBLICATIONS

R. T. Ingwall and T. Adams, "Hologram:Liquid Crystal Composites," Proceedings of the SPIE 1555, 279–290 (1991).
Y–T Huang, "Polarization Selective Volume Holograms," Applied Optics, 33, 2115 (1994).
Y–T Huang, "Polarization—independent Optical switch Composed of Holographic Optical Elements," Optics Letters, vol. 20, No. 1, 1198–1200 (May 15, 1995).
T. J. Bunning, L. V. Natarajan, V. P. Tondiglia, R. L. Sutherland, D. L. Vezie, and W. A. Adams, "Morphology of Reflection Holograms Formed In Situ Using Polymer–Dispersed Liquid Crystals," Polymer [Polymer Communications] 37, 3147 (1996).
T. J. Cloonan, "Free–Space Optical Implementation of a Feed–Forward Crossbar Network," Applied Optics 29, 2006, see Fig. 10 in particular, (1990).

(List continued on next page.)

Primary Examiner—Leslie Pascal
Assistant Examiner—Agustin Bello

(57) ABSTRACT

A switching and/or rotuing system that utilizes high efficiency switched diffractive gratings to form optical switching, interconnection, and routing networks. The diffractive gratings are electrically, optically, or otherwise switchable, so that they may be turned "off" (a state in which the incident beam is undeviated) or "on" (a state in which the incident beam is diffracted to a new direction). All of the above switching and/or routing operations being accomplished in "free space."

20 Claims, 3 Drawing Sheets

OTHER PUBLICATIONS

M. S. Malcuit and T. W. Stone, "Optically Switched Volume Holographic Elements," Optics Letters, 20, 1328 (Jun. 1, 1995).

T. Stone, M. Malcuit, and J. Kleinfeld,"Switched Grating Devices For Phased Array Applications," Proceedings of the SPIE, 2844, 182 (1996).

T. Stone, M. Malcuit, and J. Kleinfeld, and J. Kralik, "Micro–Optic Photonic Time Shifters Based On Switched Gratings," Proceedings of the SPIE, 3160, 17 (1997).

T. Stone, J. Kralik, and M. Malcuit, "Characteristics of Photonic Time Shifters Based on Switched Gratings," Proceedings of the SPIE, 3463, (Jul 21–22, 1998).

K. Tanaka, K. Kato, M. Date, and S. Sakai, "Optimization of Holographic PDLC for Reflective Color Display Applications," Society of Information Display 1995 Digest, Paper 18.1, 267 (May 1995).

R. L. Sutherland, L. V. Natarajan, V. P. Tondiglia, T. J. Bunning, and W. W. Adams, "Switchable Holograms in New Photopolymer–Liquid Crystal Composite Materials," Proceedings of the SPIE, 2404, 132 (3/1995).

H. Okayama, M. Kawahara, "Ti: $LiNbO_3$ Digital Optical Switch Matrices," Electronics Letters 29, 765 (1993).

T. Kirihara, M. Ogawa, H. Inoue, H. Kodera, K. Ishida, "Lossless And Low–crosstalk Characteristics In An InP–Based 4 ×4 Optical Switch With Integrated Single–stage Optical Amplifiers," IEEE Photonics Technology Letters 6, 218 (1994).

P. C. Huang, W. E. Stephens, T. C. Banwell, L. A. Reith, "Performance Of 4×4 Optical Crossbar Switch Utilizing Acousto–Optic Deflector," Electronics Letters 25, 252, see first Figure in particular, (1989).

Y. Wu, L. Liu, Z. Wang, "Optical Crossbar Elements USed For Switching Networks," Applied Optics 33, 175(1994).

K. Hirabayashi, T. Yamamoto, M. Yamaguchi, "Free–space Optical Interconnections With Liquid–crystal Microprism Arrays," Applied Optics 34, 2571 (May 10, 1995).

T. Sakano, K. Kimura, K. Noguchi, N. Naito, "256×256 Turnover–type Free–space Multichannel Optical Switch Based On Polarization Control Using Liquid–crystal Spatial Light Modulators," Applied Optics 34, 2581 (May 10, 1995).

C.P. Barrett, P. Blair, G. S. Buller, D. T. Neilson, B. Robertson, E.C. Smith, M. R. Taghizadeh, A.C. Walker, "Components For The Implementation Of Free–space Optical Crossbars," Applied Optics 35, 6934 (Dec. 10, 1996).

S. Reinhorn, Y. Amitai, A. A. Friesem, A. W. Lohmann, S. Gorodeisky, "Compact Optical Crossbar Switch," Applied Optics 36, 1039 (Feb. 10, 1997).

OPTICAL CROSSBAR SWITCHING AND/OR ROUTING SYSTEM

This application is a continuation-in-part of copending U.S. patent application Ser. No. 09/435,708 filed Nov. 8, 1999 entitled OPTICAL ROUTING/SWITCHING SYSTEMS. U.S. Pat. application Ser. No. 09/435,708 is a continuation-in-part of U.S. patent application Ser. No. 08/926,102 filed Sep. 9, 1997 and now U.S. Pat. No. 5,982,515 issued Nov. 9, 1999 which is in turn a divisional of U.S. patent application Ser. No. 08/640,187 filed Apr. 30, 1996 and now U.S. Pat. No. 5,692,077 issued Nov. 25, 1997. All of the above applications and patents being incorporated herein by reference.

STATEMENT OF GOVERNMENT INTEREST

This invention was made with Government support under Contract No. F08630-95-C-0095 awarded by the U.S. Air Force. The Government has certain rights in the invention.

FIELD OF THE INVENTION

The present invention relates generally to interconnection and switching systems, and, more particularly, to optical switching and interconnect systems which incorporate the use of diffractive optics and noise suppressors.

BACKGROUND OF THE INVENTION

With the advent of substantial new uses for high bandwidth digital and analog electro-optic systems, there exists a greater need to effectively control the routing and switching capability of electro-optic or optical signals from among many possible paths. This is especially true in digital computing systems where signals must be routed among processors; in analog systems such as phased array radar; and in the switching of high bandwidth optical carriers in communication systems. However, it should be realized that these are just several of numerous electro-optic systems which require the use of an optical switching or routing mechanism.

In many current and future systems light beams are modulated in a digital and/or analog fashion and used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (without waveguides such as optical fibers) can be packed closely and even intersect in space with greatly reduced crosstalk between channels. Finally, operations that are difficult to perform in the lower (e.g., radio) frequencies such as time shifting for phased array applications can often be performed more efficiently and compactly using optical carriers.

A common problem encountered in many applications in which high data rate information is modulated on optical carrier beams is the switching of the optical carriers from among an array of channels. These differing optical channels may represent, for example, routes to different processors, receiver locations, or antenna element modules. One approach to accomplish this switching is to extract the information from the optical carrier, use conventional electronic switches, and then re-modulate the optical carrier in the desired channel. However from noise, space, and cost perspectives it is more desirable to directly switch the route of the optical carrier directly from the input channel to the desired channel.

It is therefore an object of this invention to provide an optical crossbar switching and/or routing system that can independently route each and every optical carrier from an array of input channels to any of an array of output channels.

It is another object of this invention to provide an optical crossbar switching and/or routing system that provides for a compact planar geometry.

It is further an object of this invention to provide an optical switching and/or routing system that is capable of full or partial broadcast from a single or subset of inputs to selected outputs.

It is still further an object of this invention to provide an optical crossbar switching and/or routing system that provides a low loss one-to-one optical interconnection from a set of input channels to a set of output channels.

SUMMARY OF THE INVENTION

The present invention overcomes problems associated with insertion loss, size and compactness, switch isolation, switching speed, that may be present in current optical switching systems. The present invention includes switching and/or routing devices that use high efficiency switched diffractive gratings to form optical switching, interconnection, and routing networks. The diffractive gratings are electrically, optically, or otherwise switchable, so that they may be turned "off" (a state in which the incident beam is undeviated) or "on" (a state in which the incident beam is diffracted to a new direction). All of the above switching and/or routing operations being accomplished in "free space."

Further, the various systems of this invention are essentially planar, and with the use of micro-optical channels, the present invention has the potential to be packaged into small form factors as would be required for use in many computing applications.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

The present invention provides a free space optical crossbar switching and/or routing system utilizing switchable diffraction gratings (transmission or reflection). This invention provides an optical crossbar switch and/or router that is useful for, but not limited thereto, interconnecting any of an input array's optical channels with any of an output array's optical channels. The incorporation of a free space environment in the present adds even further to the advantages over past optical switching techniques. More specifically, these advantages include, but are not limited to, a reduction in insertion loss, the number of required switching devices and control signals, and improvements in switch isolation, noise and crosstalk suppression, spurious reflections, data skew, and compactness.

Figure 1:
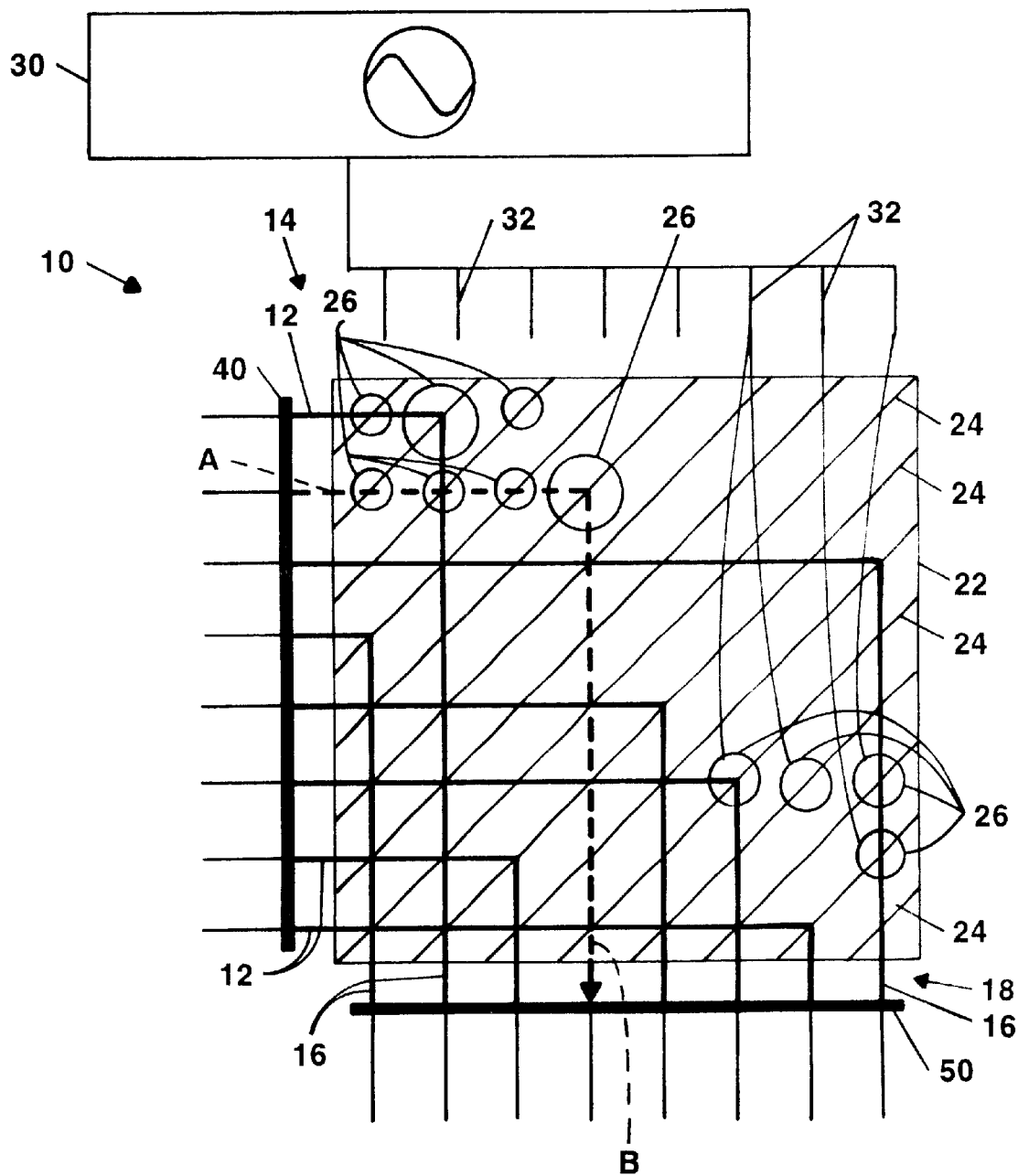
FIG. 1 is a schematic representation of the planar optical crossbar switching and/or routing system of this invention incorporating electrically switchable diffractive gratings therein.

Reference is now made to FIG. 1 of the drawings which illustrates schematically a crossbar switching and/or routing system 10 that connects each of M input beams 12 (also referred to as channels 12) in an input array 14 to any desired subset of n output channels 16 in an output array 18. This system 10 forms what can also be referred to as a crossbar switch. The input array 14 comprises M input optical channels 12 (where M=N). Each of the optical channels 12 is in the form of a beam or beams of electromagnetic energy or radiation that typically carry analog and/or digital information and are propagating in free space (i.e., free space being defined as not in waveguide structures or, stated more succinctly, free of external boundaries).

The input array 14 of free space input channels 12 may be formed using input interface 40. If used, input interface 40 constitutes an array of optical fibers, guides, semiconductor lasers, lenses, or other sources of optical inputs. For example, input interface 40 may be optical, comprising an array of optical fibers and collimators. Alternatively, input interface 40 may be electrical-to-optical, comprising electrical signals which are then used to drive emitters such as VCSELs (Vertical Cavity Surface Emitting Lasers), the output from which are then collimated to produce the input array 14. In either case, input data is carried on optical input channels 12 each of which becomes a substantially collimated beam (e.g., using microlenses) propagating in free space to the right as illustrated in FIG. 1. The input channels 12 may also be subdivided into input subchannels that are switched together as a single unit. These subchannels may take the form of signals modulated on a plurality of beams which are all incident on the same switchable grating regions 26 and switched together.

In a similar fashion the output array 18 of output beams 16 (also referred to as channels 16 propagating in free space) may exit the switching system 10 using output interface 50 (optional) comprising an array of optical fibers, detectors and amplifiers, lenses, or other forms of optical or electrical channels. For example, output interface 50 may be all optical, comprising an array of lenses or microlenses coupling the output channels 18 into optical fibers. Alternatively output interface 50 may be optical-to-electrical, converting optical output channels 16 into electrical output channels using detectors, amplifiers, and/or signal conditioning electronics.

Still referring to FIG. 1, input optical (channel) beam(s) 12 propagate in free space and are incident on an array 22 of diffractive gratings 24 which switch or re-arrange the beams into the array of output beams 18 as shown in FIG. 1. In the N×N crossbar switch embodiment shown in FIG. 1, 2N−1 diffractive gratings 24 are arranged to perform this switching operation. The diffractive gratings 24 are electrically, optically, or otherwise switchable, so that they may be turned "off" (a state in which the incident beam is undeviated) or "on" (a state in which the incident beam is diffracted to a new direction). In the switching and/or routing system 10 of the present invention, gratings which are turned "on" diffract the incident beam into a new path that is deviated from the incident path by substantially 90 degrees. Each of the diffractive gratings 24 is pixellated into one or more separately controllable elements or regions 26 that lie on the intersections of the grating and the incident optical channel paths. For example, one of these locally switchable grating regions 26 is shown circled in FIG. 1. This pixellation can be accomplished, for the case of electrically switched gratings, by lithographically patterning the electrodes over a given grating. When a grating region is switched "on", the beam(s) incident on the grating are diffracted and propagate toward an output port. If, however, a grating region is switched off, any beams incident on that grating region propagate through the grating without being diffracted.

The crossbar switching and/or routing system 10 is controlled by controller 30 which creates drive signals 32 that turn on or off each of the individually controllable grating regions 26 . For the case of electrically switched gratings, these signals are electronic and may be applied to the individual grating segments by lithographically patterning a transparent conductor such as Indium Tin Oxide (ITO).

A characteristic of the switched diffraction gratings for this application is that they form highly efficient switches: When off, substantially 100 percent of the incident light is transmitted through the grating; and when on, substantially 100 percent of the incident light is redirected into a single diffracted order, which may propagate in a completely different direction. Implementation of the planar optical crossbar configurations of this invention relies upon the ability to switch the path of the beams 12 (optical carriers) quickly, with little crosstalk and with low loss. Some of the switchable grating technologies that are capable of such high performance switching include polymer dispersed liquid crystal (PDLC) gratings; fillable porous holographic gratings; and ferroelectric liquid crystal polarization rotators in conjunction with polarization sensitive holographic gratings. The diffraction efficiency of PDLC and some other gratings may be tuned continuously using a control voltage. In this approach the holographically fabricated volume phase diffraction grating, which is typically on the order of 10 microns thick, is bounded by transparent conducting electrodes (not shown). The electrical switching approach offers potential for compact, high-speed implementation of the planar crossbars.

As further illustrated in FIG. 1, any of the input ports can be directly coupled to any of the output ports by switching on the appropriate grating region 26. An example of the operation of the system 10 is shown in FIG. 1 by connecting the second member A of input channel 12 to the fourth member B of output channel 16 as illustrated by the dashed line in FIG. 1. The regions or pixels of the first three diffractive gratings 24 that are encountered are switched "off", and the optical carrier is transmitted through them. The pixel encountered by this channel on the fourth diffractive grating 24, however, is switched "on", and it diffracts the incident beam downward toward the desired (fourth) output channel location.

All of the grating pixels encountered by these beams on the downward path to the selected output port are switched off. In this fashion, by switching on the appropriate N grating pixels, the N input channels are arbitrarily directed to the N output channels. Thus for a simple 1:1 interconnection, only a single grating in each row and a single grating in each column need be turned "on". Since the gratings can deviate the beams with little loss, system 10 may be scaled moderately without being subject to severe signal-to-noise limitations. Other more complex interconnection patterns, such as those where an input channel is connected to more than one output channel, can be obtained by using diffractive gratings with diffraction efficiencies that can be switched not only "off" and "on", but to intermediate states.

Fan-out, or "full or partial broadcast," from one input port to more than one output port can be accomplished by switching one or more grating pixels on to intermediate diffraction efficiencies. For example, two consecutive output ports can be simultaneously addressed by setting one grating pixel on at a 50 percent diffraction efficiency, and setting the following horizontally adjacent pixel to 100 percent diffraction efficiency. There are many switchable grating technologies that support such selectable intermediate levels of diffraction efficiency.

While this crossbar system 10 of the present invention is built using a free-space optical system, free space micro-optical techniques can be used to miniaturize the device and thus to achieve system sizes, depending on crossbar dimension n, that range from inches on a side to sizes that are comparable to that of an integrated circuit chip or multi-chip module (MCM). For example, the lateral extent or diameter (D) of the optical beams need only be large enough to prevent significant diffractive crosstalk between neighboring beams. Since the beams are freely propagating in free space throughout the switch over a "working distance" and not confined in waveguides, a slight amount of focusing of the beams may be useful to minimize the size of the beams required while controlling diffractive crosstalk. The beam size, slight focusing, and working distance tradeoffs are similar to that found in conventional fiber collimators. This optional degree of focusing is small, and the beams are substantially collimated. For many applications the footprint of the crossbar is on the order of one or more square centimeters, and in such a case the beam diameter can be as small as in the range of D=100–1000 microns.

Figure 2:
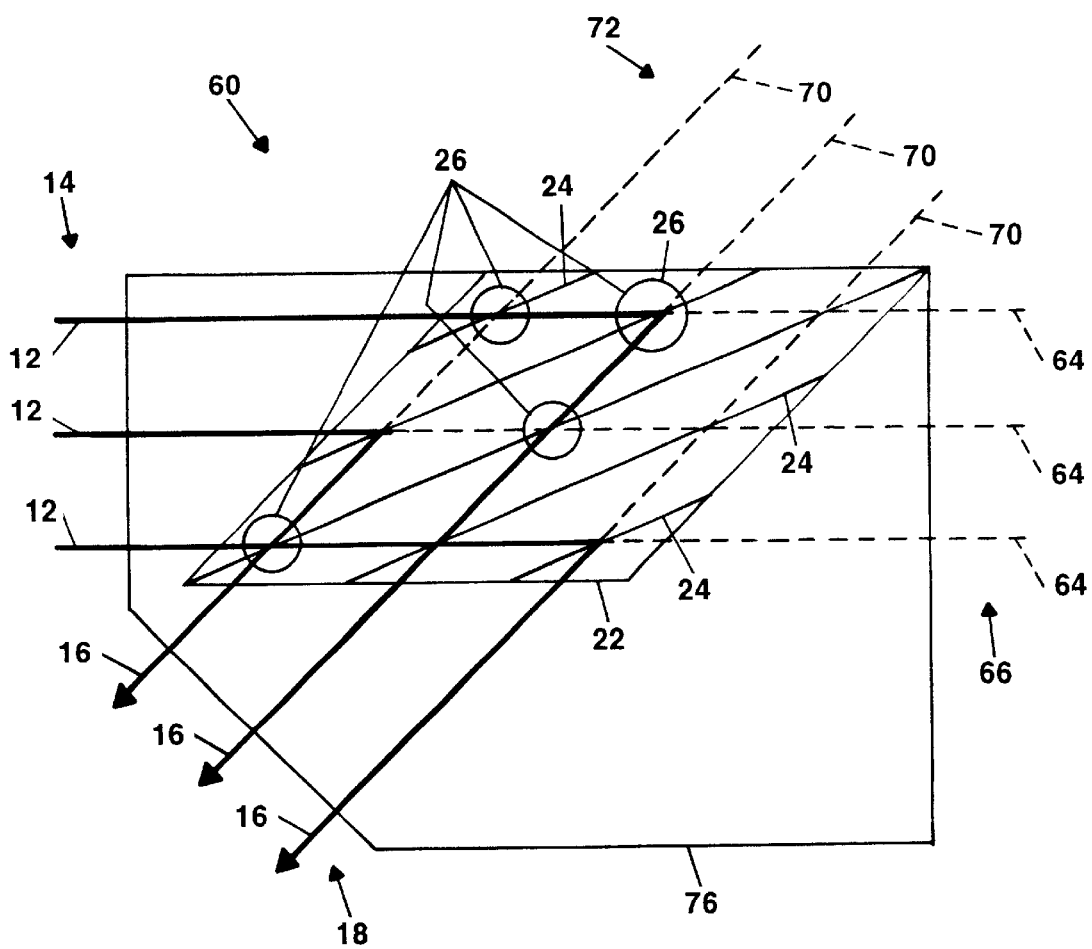
FIG. 2 is a schematic representation of an alternative embodiment of the planar optical crossbar switching and/or routing system of this invention incorporating a skew geometry and also illustrating the use of alternate input and output arrays.

Reference is now made to an alternate embodiment of the invention shown in FIG. 2 of the drawings which illustrates a skew crossbar switching and/or routing system 60. This system is similar to switching and/or routing system 10 of FIG. 1, and like elements of both systems have been given identical reference numerals throughout the drawings. The input interface 40 and output interface 50 of FIG. 1 are also optional in the switching and/or routing system 60 of FIG. 2, and, therefore, have not been shown in FIG. 2. The skew configuration is formed using diffractive transmission gratings 24 that diffract the beams through angles which are greater than (shown) or less than 90 degrees. The skew geometry enables the varied choice of incident and diffracted angles for the switched gratings, and thus gives important degrees of freedom in optimizing the switched grating technology parameters. Gratings that diffract the beam by less than 90 degrees form an alternative shallow skew geometry. A controller (not shown) such as controller 30 of FIG. 1 is used to switch on or off the individual grating regions and route the inputs to desired outputs in a manner similar to that described for system 10. Optional additional packaging 76 (such as cemented glass prisms) may be included to provide for an exit surface that is normal to the exiting beams.

In the crossbar configuration of FIG. 2, input port array 14 made up of input beams or channels 12 (these beams or channels being formed in free space) are switched among output port array 18 comprising output beams or channels 16 (also in free space). The skew configuration of this embodiment of the invention is useful, bit not limited, to provide additional degrees of freedom (e.g., angle, grating frequency, etc.) for packaging and switched grating optimization.

The dashed lines in FIG. 2 illustrate that an alternate output port array 66 comprising alternative output ports 64 may be selected by turning off all grating segments along a given optical beam path. Further configurations, for example to provide for adding and dropping signals, can be achieved by introducing an alternate input port array 72 comprising input beam channels 70 in addition to the alternate output array 66. When a grating region 26 is turned on, the beam from input array 14 is redirected from its incident path, and at the same time the beam incident on that same switchable grating region 26 from input array 72 is also redirected from its original path. Alternatively, When a grating region 26 is turned off, the beam from input array 14 is transmitted in its original incident path, and at the same time the beam incident on that same switchable grating region 26 from input array 72 is also transmitted in its original path. This function can be useful for adding and dropping signals among the multiple input and/or output arrays.

Figure 3:
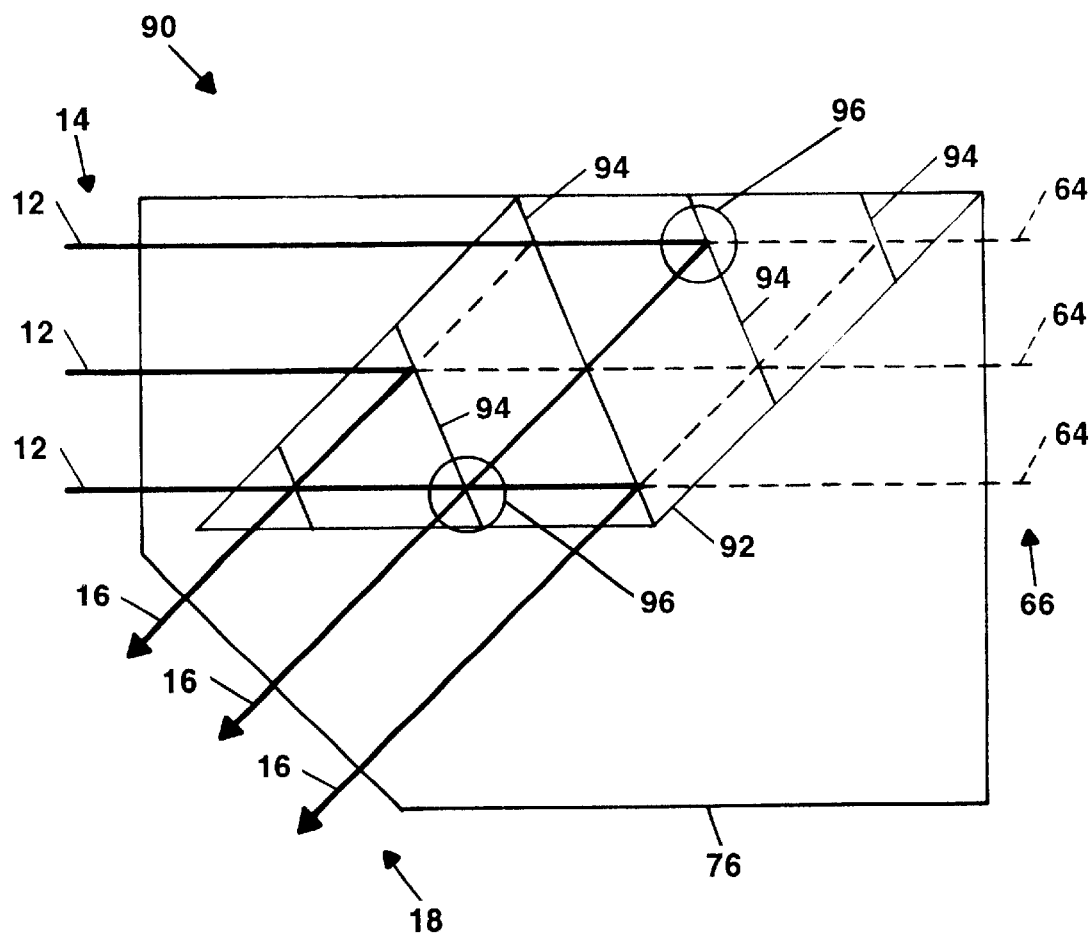
FIG. 3 is a schematic representation of the planar optical crossbar switching and/or routing system of this invention incorporating switchable volume holographic mirrors therein.

Another alternate embodiment of the present invention is illustrated in FIG. 3. This planar crossbar system 90 makes use of an array 92 of switchable reflection gratings 94 (or referred to as switchable mirrors). The switchable reflection gratings 94 may be, for example, volume holographic diffraction gratings as well as derived from other generic switched mirror technology. This embodiment of the invention benefits from the freedom from angular-dispersion related effects present in transmission gratings that can complicate or reduce coupling efficiency in to components following the system output. The input interface 40 and output interface 50 of FIG. 1 are also optional in the switching and/or routing system 90 of FIG. 3, and have not been shown.

As in systems 10 and 60, the switched reflection gratings in system 90 are used to steer the optical channels 12 through the crossbar. A controller (not shown) such as controller 30 of FIG. 1 is used to switch on or off the individual reflection grating regions 96 and route the inputs to desired outputs as described for system 10. Operation of system 90 is substantially identical to the operation of switching and/or routing systems 10 and 60, except that the orientation of the switchable reflection gratings has changed to support reflection from the gratings rather than transmission through the gratings. Alternate input array 72 (not shown) and alternate output array 66 (not shown) of the type described in system 60 are also optional for system 90.

The switched gratings 24 and 94 used in the various embodiments of the present invention may be fabricated and pixellated as described earlier to form the individually switchable grating regions 26 and 96. Alternatively, the individually switchable grating regions 26 and 96 may be fabricated as a plurality of individual switched subgratings or grating components and assembled into the elements 24 and 94 that contain switchable regions 26 and 96, respectively. It is usually desirable to fabricate fewer, larger elements which are then pixellated. Further, it is typically preferred for compactness and ease of fabrication that the switched gratings 24 and 94 used in the present invention are substantially parallel and evenly spaced.

The optical crossbar switching and/or routing system 10 of the present invention is illustrated for the case of 8 inputs and 8 outputs, also referred to as a crossbar dimension of 8×8. Similarly, the optical crossbar switching and/or routing systems 60 and 90 of the present invention are illustrated for the dimensions of three inputs and three outputs, or a crossbar dimension of 3×3. System scaling of these dimensions can be used to vary from 2×2 to much larger systems, e.g., 64×64. Further, asymmetric crossbar dimensions can be obtained in a straightforward manner by asymmetrically scaling the system. This is illustrated using FIG. 1 for example by eliminating the lower half of grating array 22. The resulting system would thus have 4 inputs switchable among 8 outputs, or a crossbar dimension of 4×8. In general, for an M×N switch, there will be M+N−1 (where M=N, it is 2N−1) cascaded gratings, each with at least one separately switchable region.

Due to the inherently planar nature of the switching and/or routing systems of the present invention, a plurality of independent switching and/or routing systems can be formed with little added complexity by extending the gratings out of the plane of FIGS. 1–3. For example consider the 8×8 optical crossbar switching and/or routing system 10 of the present invention illustrated in FIG. 1. If each of the input optical (channel) beams 12 are 1 mm in diameter, and if they are spaced by 1 mm, then the approximate dimension of grating array 22 is 1.5 cm×1.5 cm×1 mm. If the gratings 24 of grating array 22 are made 1.5 cm high (in the dimension out of the plane of FIG. 1) instead of 1 mm high, then eight or more such 8×8 switching/routing systems can be built, each vertically stacked with a separation of 1 mm, using the single cascade of 15 gratings. In this approach, each grating would additionally be separately pixellated for each of the layered 8×8 switching/routing systems.

Although the invention has been described with reference to particular embodiments, it will be understood that this invention is also capable of further and other embodiments within the spirit and scope of the appended claims.

What is claimed is:

1. An optical crossbar switching and/or routing system comprising:
   diffractive grating means for receiving and directing each of a plurality of input beams of electromagnetic radiation to travel in free space along a predetermined path of a plurality of separate paths to a predetermined output location of a plurality of output locations;
   said diffractive grating means comprising a plurality of substantially evenly spaced apart switchable diffractive gratings and each of said spaced apart switchable diffractive gratings having at least one separately switchable region; and
   said at least one said separately switchable region of said switchable diffractive gratings capable of being selectively activated or deactivated in order to independently control which said predetermined path of said plurality of separate paths at least one of said plurality of input beams of electromagnetic radiation travels in free space.

2. The optical crossbar switching and/or routing system as defined in claim 1 wherein said at least one of said diffractive gratings has a plurality of grating regions located along a plurality of positions on said at least one of said diffractive gratings.

3. The optical crossbar switching and/or routing system as defined in claim 1 wherein each of said plurality of input beams of electromagnetic radiation carries analog and/or digital information thereon.

4. The optical crossbar switching and/or routing system as defined in claim 1 wherein said at least one said separately switchable region of said switchable diffractive gratings is transmissive.

5. The optical crossbar switching and/or routing system as defined in claim 1 wherein said at least one said separately switchable region of said switchable diffractive gratings is reflective.

6. The optical crossbar switching and/or routing system as defined in claim 1 wherein said at least one said separately switchable region of said switchable diffractive gratings deviates said predetermined path of at least one of said plurality of input beams of electromagnetic radiation by substantially ninety degrees.

7. The optical crossbar switching and/or routing system as defined in claim 1 wherein said at least one said separately switchable region of said switchable diffractive gratings deviates said predetermined path of at least one of said plurality of input beams of electromagnetic radiation by other than ninety degrees.

8. The optical crossbar switching and/or routing system as defined in claim 1 wherein said at least one said separately switchable region of said switchable diffractive gratings comprises a volume holographic grating.

9. The optical crossbar switching and or routing system as defined in claim 8 wherein said volume holographic grating is a polymer dispersed liquid crystal grating.

10. An optical crossbar switching or routing system comprising:
    diffractive grating means for receiving and directing each of a plurality of M input beams of electromagnetic radiation to travel in free space along a predetermined path of a plurality of separate paths to a predetermined output location of a plurality of N output locations;
    said diffractive grating means comprising a plurality of spaced apart switchable diffractive gratings and each of said spaced apart switchable diffractive gratings having at least one separately switchable region;
    at least one said separately switchable region of said switchable diffractive gratings capable of being selectively activated or deactivated in order to independently control which said predetermined path of said plurality of separate paths at least one of said plurality of input beams of electromagnetic radiation travels in free space; and
    wherein when N equals M there are 2N−1 said switchable diffractive gratings and when N does not equal M there are M+N−1 said switchable diffractive gratings.

11. The optical crossbar switching and/or routing system as defined in claim 10 wherein said at least one said separately switchable region of said switchable diffractive gratings is transmissive.

12. The optical crossbar switching and/or routing system as defined in claim 10 wherein said at least one said separately switchable region of said switchable diffractive gratings is reflective.

13. The optical crossbar switching and/or routing system as defined in claim 10 wherein said at least one said separately switchable region of said switchable diffractive gratings deviates said predetermined path of at least one of said plurality of input beams of electromagnetic radiation by substantially ninety degrees.

14. The optical crossbar switching and/or routing system as defined in claim 10 wherein said at least one said separately switchable region of said switchable diffractive gratings deviates said predetermined path of at least one of said plurality of input beams of electromagnetic radiation by other than ninety degrees.

15. An optical crossbar switching or routing system comprising:
    diffractive grating means for receiving and directing each of a plurality of input beams of electromagnetic radiation to travel in free space along a predetermined path of a plurality of separate paths to a predetermined output location of a plurality of output locations;

said diffractive grating means comprising a plurality of spaced apart switchable diffractive gratings, said plurality of spaced apart switchable diffractive gratings being substantially equally spaced from each other and spaced substantially parallel to each other, and each of said spaced apart switchable diffractive gratings having at least one separately switchable region; and said at least one said separately switchable region of said switchable diffractive gratings capable of being selectively activated or deactivated in order to independently control which said predetermined path of said plurality of separate paths at least one of said plurality of input beams of electromagnetic radiation travels in free space.

16. The optical crossbar switching and/or routing system as defined in claim 15 wherein said at least one said separately switchable region of said switchable diffractive gratings is transmissive.

17. The optical crossbar switching and/or routing system as defined in claim 15 wherein said at least one said separately switchable region of said switchable diffractive gratings is reflective.

18. The optical crossbar switching and/or routing system as defined in claim 15 wherein said at least one said separately switchable region of said switchable diffractive gratings deviates said predetermined path of at least one of said plurality of input beams of electromagnetic radiation by substantially ninety degrees.

19. The optical crossbar switching and/or routing system as defined in claim 15 wherein said at least one said separately switchable region of said switchable diffractive gratings deviates said predetermined path of at least one of said plurality of input beams of electromagnetic radiation by other than ninety degrees.

20. The optical crossbar switching and/or routing system as defined in claim 15 further comprising:

M input beams of electromagnetic radiation;

N output locations; and wherein when N equals M there are 2N−1 said switchable diffractive gratings and when N does not equal M there are M+N−1 said switchable diffractive gratings.

* * * * *